June 19, 1962 L. A. D'ASARO 3,040,196

SEMICONDUCTOR PULSE TRANSLATING SYSTEM

Filed July 22, 1959 3 Sheets-Sheet 1

INVENTOR
L. A. D'ASARO
BY H. W. Lockhart
ATTORNEY

June 19, 1962 L. A. D'ASARO 3,040,196

SEMICONDUCTOR PULSE TRANSLATING SYSTEM

Filed July 22, 1959 3 Sheets-Sheet 2

INVENTOR
L. A. D'ASARO
BY
ATTORNE

June 19, 1962 L. A. D'ASARO 3,040,196

SEMICONDUCTOR PULSE TRANSLATING SYSTEM

Filed July 22, 1959 3 Sheets-Sheet 3

INVENTOR
L. A. D'ASARO
BY H. W. Lockhart
ATTORNEY 3,040,196

SEMICONDUCTOR PULSE TRANSLATING SYSTEM

Lucian A. D'Asaro, Madison, N.J., assignor to Bell Telephone Laboratories, Incorporated, New York, N.Y., a corporation of New York Filed July 22, 1959, Ser. No. 828,871
2 Claims. (Cl. 307—88.5)

This invention relates to semiconductor pulse translators of the type which transfer operation from one device to another in response to suitable pulses of energy and, more particularly, to circuit arrangements including such semiconductor devices for counting, coding and similar switching operations. This application is a continuation-in-part of my copending application Serial No. 803,507, filed April 1, 1959.

Integrated semiconductor structures including sections which can be placed successively in a conducting condition by the application of suitable signals are disclosed in U.S. Patents 2,856,544 and 2,877,358 to I. M. Ross. The semiconductor devices, as disclosed in the above-mentioned patents, are most useful in switching systems which utilize the stepping characteristic which denotes the transfer of the low impedance condition from section to section of the device. These devices rely upon an emission concentration effect and require at least two zones of conductivity-type material which are common to the different sections of the structure. The provision of more complicated switching arrays requires integrated structures of considerable complexity using the devices of the type disclosed by Ross.

This invention involves the recognition that the directional preference exhibited by the integrated structures of the above-mentioned patents can be realized in arrays of single semiconductor elements of the type described in my copending application referred to above which enable greater flexibility in circuit design and simplify the fabrication of such systems. An important aspect of such flexibility arises from the availability of electrical connections to intermediate regions of individual semiconductor elements to enable selection of a specific starting point for operation of the array. Moreover, there are realized certain other advantages in the use of single semiconductor elements. For example, current amplification may be attained in the same devices for accomplishing stepping functions.

Therefore an object of this invention is to simplify the fabrication of counting and coding systems which employ semiconductor stepping devices.

Another object is a semiconductor device which combines the directional electrical characteristic with the ability to achieve current amplification.

A further object is a new semiconductor switching element.

In one exemplary embodiment in acordance with this invention, a plurality of substantially identical semiconductor stepping elements are connected in a serial array. Each semiconductor element comprises a wafer of semiconductor material having therein four conductivity-type regions or layers to provide a PNPN configuration. Adjacent to, and coextensive with, one major face of the wafer is a region of P-type conductivity. Adjacent to the other major face is a region of N-type conductivity which is termed the "emitter" and which is not coextensive with the entire face of the wafer and, additionally, is offset with respect to the center of the wafer face. The intermediate P-type region contiguous with the emitter region likewise is not coextensive with the entire face of the wafer but is greater in extent than the emitter region.

The intermediate N-type region which is termed the "base" is coextensive with the entire length and width of the wafer and has a low resistance electrode at both ends of the region, the one base electrode being close to, and the other remote from the offset emitter region. In addition to the two base electrodes, a low resistance electrode connection is made to the emitter region and to the P-type region adjacent to the opposite face of the wafer. In one stepping circuit arrangement, the latter-mentioned P-type region electrode connections of the several elements are interconnected. The base electrode close to the emitter region of each element is connected to the base electrode remote from the emitter region of the next adjoining element.

Upon placing any one of the above-described four-region elements in the low impedance state, for example, by the application of a potential equal to or greater than the breakdown potential, all three junctions of the element will be biased in the forward direction. Thus, electron current produced by minority carrier injection at the emitter junction will traverse the intermediate P-type region and will be collected at the next PN junction. This collected current will flow laterally in the N-type base region to the connections at each end of the region. As a consequence of the location of the emitter and the significant lateral resistance of the base region material, this base current results in a lower potential at the base connection remote from the emitter region than at the base connection close to the emitter region. Therefore, the four-region stepping element connected at one end of the conducting element is subjected to a higher potential than the stepping element connected at the other end. The effect of this higher potential is to reduce the level of potential required to cause breakdown and conduction in the element on one side while the element at the other side is substantially unaffected in this respect.

It will be appreciated from the foregoing that the significant aspect of the structure for producing a potential shift is the differential dimensionwise in the position of the two base electrodes with respect to the emitter region. Thus, in some instances the emitter region may be located symmetrically with respect to the entire wafer but may be effectively offset as a result of the unequal distance between the emitter and the two base electrodes.

Consequently, if a signal represented by a given potential, less than the standard breakdown potential of the elements, is applied to both adjacent elements, only the element on the higher potential side will attain the low impedance state. This element will retain the low impedance state even after removal of the potential on the element which first was conducting. Thus, the conducting state is transferred from one element to the next in a preferred direction.

One feature of this invention is an interconnected array of individual semiconductor elements, each exhibiting bistable voltage-current characteristics and capable of shifting the low impedance state from element to element in a preselected order.

In accordance with another feature the low impedance state is initiated in a particular selected element by means of a current pulse applied to the base interconnection between the element in which conduction is desired and the element next in order to become conducting.

Another feature of this invention involves applying and detecting signals at the base region terminals, which signals are stepped through an array of semiconductor elements and amplified at the same time.

A significant advantage of individual semiconductor stepping elements in accordance with this invention is the simplification of fabrication of switching systems and the increased flexibility of arrangement achieved with respect to semiconductor pulse translators and the like.

A better understanding of the invention and its other objects and advantages will be obtained from the following detailed description taken in conjunction with the drawing in which.

Figure 1:
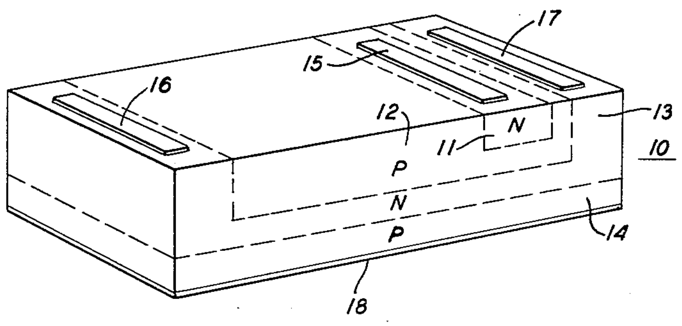
FIG. 1 is a perspective view of a semiconductor stepping element in accordance with this invention.

The semiconductor stepping element of FIG. 1 comprises a wafer 10 of silicon containing four regions of alternate N and P-type material. The terminal region 14 of P-type conductivity adjoins an intermediate N-type region 13, hereinafter referred to as the "base." A low resistance electrode is provided to region 14 by the metallic plating 18, generally applied to the entire face of region 14. Adjoining the base region 13 is an intermediate P-type region 12 which is free of electrodes and whose lateral extent is less than the entire length of the wafer to enable contact to be made to the base region on the upper face of the wafer. Contiguous with only a small portion of region 12 is an N-type region 11, hereinafter referred to as the "emitter," which functions as a control zone. The N-type emitter region 11, in addition to being smaller in lateral extent relative to the other regions, is offset to one end of the wafer so as to render the arrangement asymmetrical.

For example, the wafer may have a length of .046 inch, a width of .012 inch, and a final thickness of about .0037 inch. Typically, the P-type region 14 has a thickness of .0025 inch and the other P-type region 12 a thickness of .0007 inch and a length of .036 inch. Thus, the N-type base 13 has a minimum thickness of about .0005 inch and the N-type emitter 11 has a thickness of about .0005 inch and a dimension of .005 inch taken lengthwise along the wafer and is spaced about .001 inch away from the portion of the base region 13 upon which the electrode 17 is attached.

Low resistance electrical contact is provided to both ends of the base region 13 by the metallic electrode 16 close to the emitter region 11 and the metallic electrode 17 remote from the emitter region 11. A low resistance plated metal electrode 15 is applied to the emitter region 11.

The semiconductor stepping element of FIG. 1 is fabricated using well-known techniques of masking, coupled with solid state diffusion. One such method is described in my copending application referred to above. Advantageously, the majority of the processing steps are accomplished on a larger slice of semiconductor material which is subsequently divided into individual elements, each as shown in FIG. 1.

For example, the starting material may be a slice of single crystal silicon of N-type conductivity about 0.5 inch in diameter and .011 inch thick and having an impurity concentration of $3\times10^{16}$ atoms per cubic centimeter, corresponding to a resistivity of .17 ohm centimeters.

After completion of the specific process set forth in my copending application, a semiconductor slice including many wafers, each having the dimensions and conductivity-type regions specified above, results, in which the N-type emitter region 11 of each wafer has an impurity concentration of about $2\times10^{20}$ atoms per cubic centimeter.

Advantageously, the back face of the semiconductor slice adjacent to the P-type material corresponding to the region 14 is plated with nickel before the final phosphorus diffusion step. This plating enhances the later application of low resistance electrodes and also increases the lifetime of minority carriers in accordance with the teachings of U.S. Patent 2,827,436, granted March 18, 1956, to G. Bemski.

Next, the upper surface of the slice again is subjected to a photoresist and masking operation, similar to that described in the application referred to above, for the purpose of delineating the regions to be contacted with electrodes. Gold and silver are evaporated on the upper face of the slice and alloyed into the exposed semiconductor surfaces to provide the low resistance electrodes 15, 16 and 17 on each element. The metal plating on the oxide surface is removed readily by simply peeling it off, and the oxide masking is then removed. The slice is then divided by sawing or etching into the individual stepping elements as depicted in FIG. 1. Electrical contact is made to the element 10 by alloying using a gold film to the plated layer 18 on a header or mounting platform and by thermo-compression bonding to electrodes 15, 16 and 17 in accordance with the techniques disclosed in O. L. Anderson and H. Christensen Patent 3,006,067, issued October 31, 1961.

Figure 2:
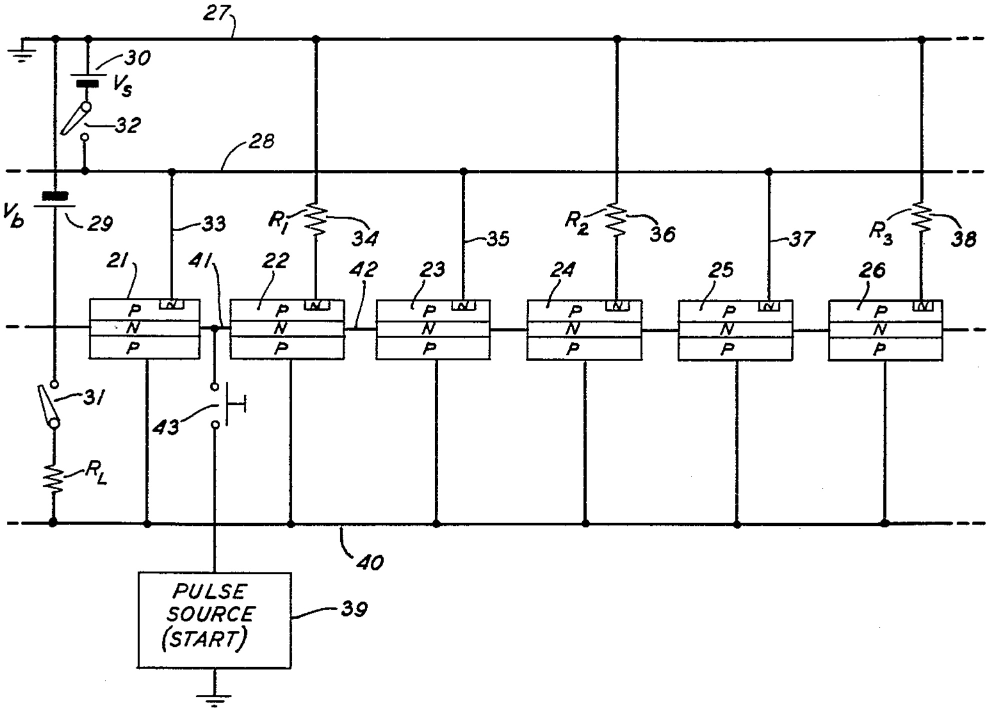
FIG. 2 is a circuit diagram of a counting arrangement using semiconductor elements in accordance with this invention.

FIG. 2 is a partial view of an array of stepping elements each of the type described in connection with FIG. 1 arranged for a simple pulse counting operation. For convenience of illustration, the base region electrodes are shown attached to the ends rather than the top of the element. As shown, the emitter of every other element is connected to one voltage source and the emitter of the remaining elements to another voltage source. To start the operation of the counting circuit, the switch 31 is closed and the voltage $V_b$ of the battery 29 is applied from the bus 27 across the even-numbered semiconductor stepping elements 22, 24, 26, et cetera. This voltage is insufficient to initiate conduction through any of these elements and therefore there is applied from the pulse source 39 by closure of switch 43 an additional voltage across two of the PN junctions of the element 22. It is to be understood that this is a momentary starting pulse and in other circuit configurations the pulse may be applied to other elements in the array wherever it is desired that the counting operation begin. This additional pulse, in effect, reduces the magnitude of the voltage required across the entire device to cause breakdown. As used herein, the term "breakdown" will be understood to denote the nondestructive or avalanche-type occurrence of the conducting state. This starting pulse may be considered as a current injection which increases the charge carrier density in the intermediate region next to the normally reverse biased junction and enables attainment of the low impedance state at a lower applied voltage than is otherwise possible.

As mentioned hereinbefore, with the element 22 in the conducting state the effect of the offset control or emitter zone thereof is to produce a voltage of greater magnitude between the connection 42 to the base electrode closer to the emitter zone and the common interconnection 40 than the voltage between the connection 41 to the base electrode more distant from the emitter zone and the common interconnection 40. Thus, a greater voltage is applied across a portion of the element 23 which is on the right of element 22 than is applied to a similar portion of the element 21 on the left of element 22. In a typical configuration, the current through the base connection 42 close to the emitter zone is about ten times as large as the current through the base connection 41 which is more distant from the emitter zone. If the switch 32 is now closed, indicating the passage of a pulse, the potential $V_s$ of battery 30, as well as the potential $V_b$ of battery 29, is supplied through bus 28 to the elements 21, 23 and 25. However, the voltage thus applied is insufficient to cause breakdown in any of the elements, except element 23 in which the required breakdown voltage has been effectively lowered by the transfer of potential from the conducting element 22. With the increase in current caused by conduction through the element 23, the voltage drop occasioned by the resistor $R_L$ is increased which effectively reduces the potential applied across the element 22 to a value sufficiently low to cause the element to return to the high impedance condition. Thus, with the application of a pulse to be counted, the low impedance condition has shifted one element to the right from element 22 to element 23.

Upon passage of another pulse, as indicated by opening the switch 32, conduction will again shift one stage to the right in a similar manner. It will be understood, of course, that the elements may be arranged in a lengthier serial arrangement, with varying numbers of input lines, or in a ring configuration in accordance with logic circuit techniques well known in the art.

Figure 3:
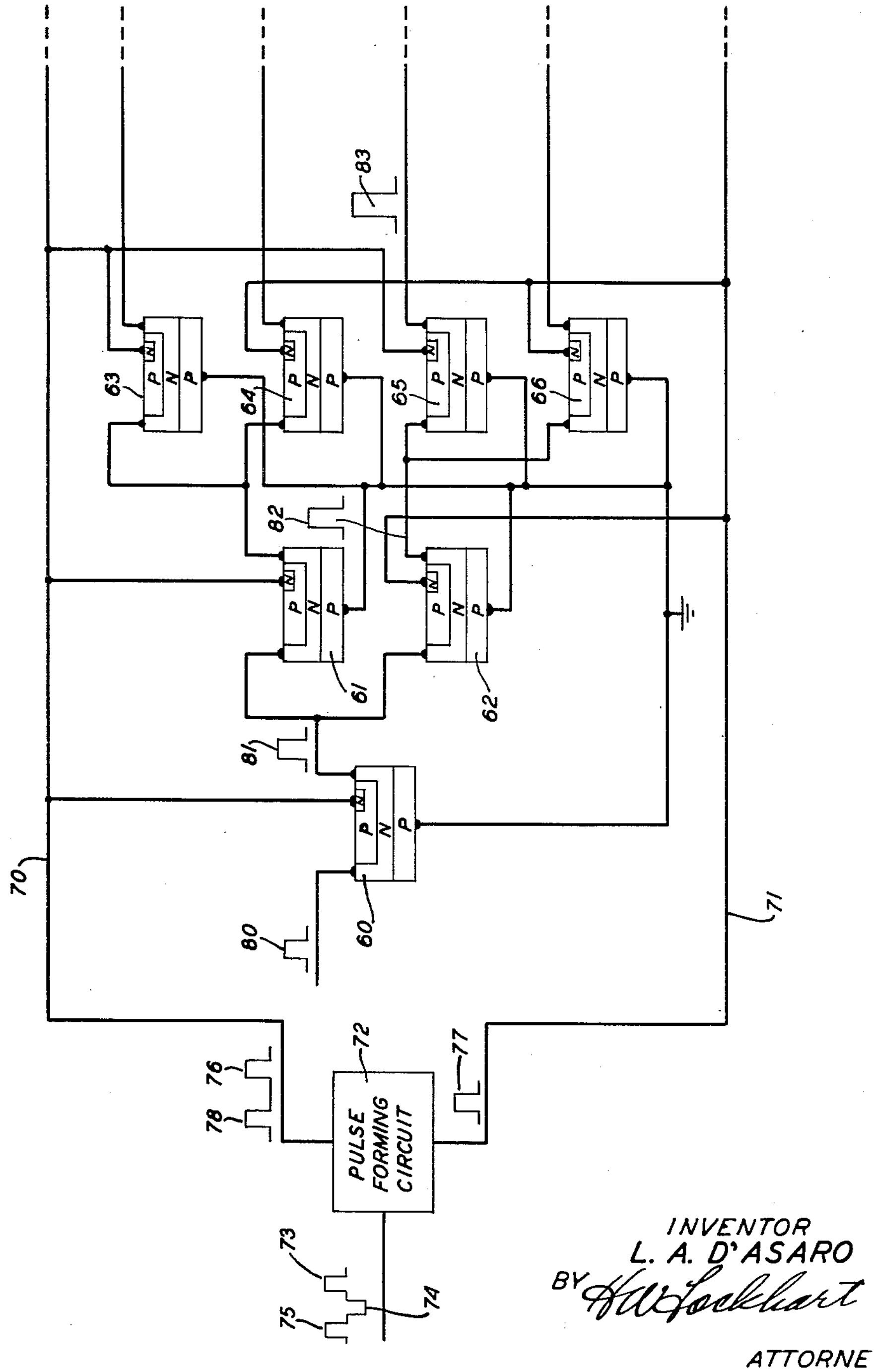
FIG. 3 is a circuit diagram of a simplified gating circuit arrangement suitable for decoding using semiconductor stepping elements.

Another circuit arrangement using stepping elements in accordance with this invention is shown in FIG. 3. In this arrangement, single elements are shown providing an output to operate two elements in the next successive stage. In addition, by suitably proportioning the input pulses, the magnitude of the output current pulse may be increased.

An input pulse 80 to the element 60 is to be gated to a particular output lead in accordance with a code represented by the pulses 73, 74, 75. A pulse forming circuit denoted by the box 72 transforms the code into positive pulses on line 70 if the input is positive and line 71 if negative. Timing arrangements, not shown, ensure that a coding pulse and the input pulse being gated will be applied to a given element simultaneously.

More specifically, the leading positive code pulse 73 emerges as pulse 76 on line 70 and thus is applied to elements 60, 61, 63 and 65. Because of the simultaneous application of pulse 80 thereto, only element 60 goes into the conducting state, thereby producing an output pulse 81 on the other base connection of element 60. Advantageously, the output pulse 81 can be made to be of increased amplitude by providing suitable coding pulses, as described below.

The output pulse 81, in turn, is applied to the input base electrodes of elements 61 and 62. Simultaneously, with this applied pulse, the pulse 77 on line 71, derived from the negative code pulse 74, is applied to elements 62, 64 and 66 so that only the element 62 attains the conducting state. As a consequence, pulse 82 appears on the output base electrode of element 62 and is applied, in turn, to elements 65 and 66. Pulse 78, derived from positive code pulse 75, is applied from line 70 to elements 60, 61, 63 and 65 with the result that element 65 conducts and output pulse 83 appears as indicated. It is apparent that additional stages and more complex codes may be arranged using these principles. For example, the number of elements in successive groups need not be related in specific arithmetic or geometric progression.

In the arrangement of FIG. 3, each stepping element performs in a manner analogous to a simple AND gate with the added feature that it is capable of providing an amplified output pulse dependent upon the magnitude of the current input to the emitter region. Thus, if the load to be driven consists of a lamp or similar element requiring significant power for actuation, the necessity of a separate amplification stage to provide sufficient power to operate the load is eliminated.

Figure 4:
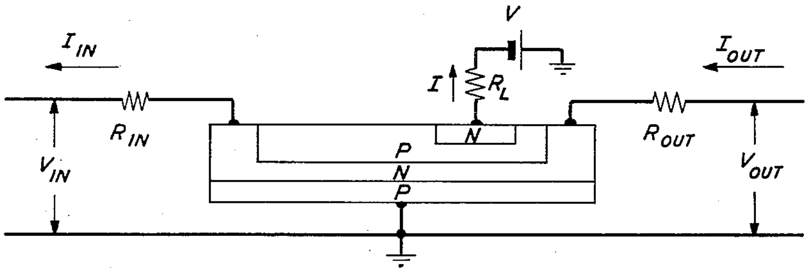
FIG. 4 is a schematic diagram of a stepping element showing various circuit parameters.
Figure 5:
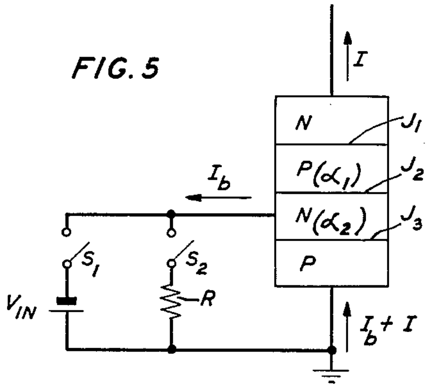
FIG. 5 is a diagram of one equivalent form of the arrangement of FIG. 4.

Referring to FIGS. 4 and 5, one form of explanation of the amplification characteristic of the semiconductor stepping element is as follows. The stepping element shown in FIG. 4 is similar in operation from the standpoint of the current amplification phenomena to the device arrangement of FIG. 5. In the four-region device of FIG. 5, $J_1$, $J_2$ and $J_3$ denote the three PN junctions and $\alpha_1$ and $\alpha_2$ the current amplification factors of the NPN and PNP structures, respectively, included therewithin.

Figure 6:
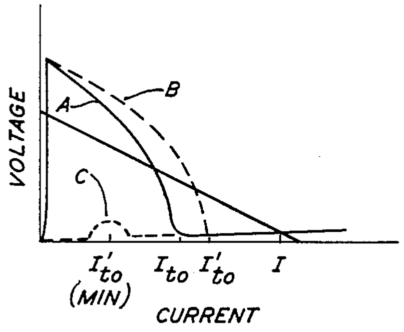
FIG. 6 is a graph showing the voltage-current characteristics of a stepping element under several impedance conditions.

When the switch $S_1$ is closed, the voltage $V_{in}$ is applied to the N-type base region and serves to lower the peak in the V–I characteristic of the device so as to place it in the conducting state. The typical V–I characteristic is shown by curve A of FIG. 6. If switch $S_1$ is opened, the conducting state persists, and if then switch $S_2$ is closed, current flows through resistance R, which current is analogous to the output current $I_{out}$ shown in FIG. 4. Correspondingly, the current required to reduce the peak in V–I characteristic to induce the conducting state with switches $S_1$ closed and $S_2$ opened is analogous to the input current $I_{in}$ of FIG. 4.

In order to examine the current amplification of the four-region stepping element, it is useful to find first the relation between the base current $I_b$ and the device current I as denoted in FIG. 5. To simplify this problem, the potential across junction $J_2$ is taken as zero, which is the condition when the current I takes on the value referred to as the "turn-on" current $I_{to}$, which is the smallest value of current I, sufficient to induce the conducting state. Then, since the current crossing junction $J_2$ must equal the current in the external circuit, the following expressions may be written $$I_{to}=\alpha_1 I_{to}+\alpha_2(I_b+I_{to}) \quad (1)$$

$$I_{to}=\frac{\alpha_2 I_b}{1-(\alpha_1+\alpha_2)} \quad (2)$$

Equation 2 holds whether $I_b$ is positive or negative, being positive when switch $S_1$ is closed. Thus, with switch $S_1$ closed, it follows that $\alpha_1+\alpha_2<1$. When $I_b$ is negative (switch $S_1$ opened and switch $S_2$ closed), $\alpha_1+\alpha_2>1$. Under the latter condition, the output current can be calculated, as follows. If the value of the resistance R is decreased so that $I_{out}$ is increased, the turn-on current is increased to a value such as $I'_{to}$ in FIG. 6. The V–I characteristic is changed as represented by the portion denoted by the curve B. If the output current is increased sufficiently, the turn-on current will reach a value corresponding to the device current I. The turn-on current cannot exceed this value of current I since such condition will cause the element to return to the nonconducting state, in other words, to switch off. Thus, the maximum output current for the condition $I'_{to}=I$ substituted in Equation 2 is $$I_b=I_{out}=I\left[\frac{1-(\alpha_1+\alpha_2)}{\alpha_2}\right] \quad (3)$$

With the switch $S_1$ closed and switch $S_2$ opened, the input current similarly can be calculated. If the input current $I_{in}$ is increased, the turn-on current $I'_{to}$ is decreased and the V–I characteristic has the form shown as curve C in FIG. 6. If the input current is sufficiently large, the normal peak in the characteristic will be lowered as shown by curve B and may approach a flat curve. The input current required to reduce the peak to zero (the condition $I'_{to}$ a minimum) is given by substituting in Equation 2

$$I_{in}=I'_{to\,(min)}\left[\frac{1-(\alpha_1+\alpha_2)}{\alpha_2}\right] \quad (4)$$

An expression for the amplification of the device may be written by dividing Equation 3 by Equation 4

$$\frac{I_{out}}{I_{in}}=\frac{I}{I'_{to\,(min)}}\cdot\frac{\dfrac{1-(\alpha_1 I+\alpha_2 I)}{\alpha_2 I}}{\dfrac{1-(\alpha_1 I'_{to\,(min)}+\alpha_2 I'_{to\,(min)})}{\alpha_2 I'_{to\,(min)}}} \quad (5)$$

The term on the right involving $\alpha_1$ and $\alpha_2$ is approximately equal to 1, as may be seen from the following explanation. When the device is in the conducting state, the sum of $\alpha_1$ and $\alpha_2$ is somewhat greater than 1, and with the device in the nonconducting state the sum of $\alpha_1$ and $\alpha_2$ is somewhat less than 1. Therefore $$|1-(\alpha_1+\alpha_2)|_{on} \approx |1-(\alpha_1+\alpha_2)|_{off}$$

Thus, the term on the right involving $\alpha_1$ and $\alpha_2$ may be written $$\frac{\alpha_2 I'_{to(min)}}{\alpha_2 I}$$

which is usually slightly less than 1 but certainly greater than 0.5.

Then rewriting Equation 5

$$\frac{I_{out}}{I_{in}} \simeq \frac{I}{I'_{to\,(min)}}$$

Because $I'_{to(min)}$ is larger than the base current $I_{(b)}$ actually required to reduce the peak in the V–I characteristic of the level at which switching occurs, the value of the ratio $$\frac{I_{out}}{I_{in}}$$

in Equation 6 will be smaller than the maximum value attainable.

Typically, I may be 10 milliamperes and $I'_{to(min)}$ may be 0.5 milliampere, for which condition the ratio of $$\frac{I_{out}}{I_{in}}$$

will be equal to or greater than 20.

Although the stepping elements of the above embodiments have been described in terms of a particular configuration of conductivity-type regions, it will be understood that this may be reversed by simply reversing likewise the polarity of the various applied voltages. Although the invention has been described in terms of several specific embodiments, it will be understood that other arrangements may be devised by those skilled in the art which will likewise be within the scope and spirit of the invention.

What is claimed is:

1. An electrical pulse counting system including a succession of individual stepping units forming at least two separate groups, each stepping unit comprising a PNPN semiconductor wafer of which one of its end regions serves as the control region, said control region being offset on the wafer, a first electrode contacting said control region, a second electrode contacting the other end region, third and fourth electrodes, respectively, contacting the intermediate region contiguous with said other end region at portions close to and remote from said control region, circuit means interconnecting the second electrodes of each unit, circuit means interconnecting the third electrode of each unit and the fourth electrode of the next succeeding unit, a plurality of circuit means each interconnecting the first electrodes of the units of each separate group, a first potential source connected between the second electrode interconnecting means and one of said first electrode interconnecting means, at least one other potential source connected between said one first electrode interconnecting means and another one of said first electrode interconnecting means, and switching means associated with said other source responsive to the signal pulses being counted.

2. An electrical pulse counting system including a succession of individual stepping units forming at least two separate groups, each stepping unit comprising a PNPN semiconductor wafer of which one of its end regions serves as the control region, said control region being offset on the wafer, a first electrode contacting said control region, a second electrode contacting the other end region, third and fourth electrodes, respectively, contacting the intermediate region contiguous with said other end region at portions close to and remote from said control region, circuit means interconnecting the second electrodes of each unit, circuit means interconnecting the third electrode of each unit and the fourth electrode of the next succeeding unit, a plurality of circuit means each interconnecting the first electrodes of the units of each separate group, a first potential source connected between the second electrode interconnecting means and one of said first electrode interconnecting means, at least one other potential source connected between said one first electrode interconnecting means and another one of said first electrode interconnecting means, said one first electrode interconnecting means being connected to ground potential, said first potential source being of opposite polarity from that of said other potential source with respect to said ground connection, and switching means associated with said other potential source responsive to the signal pulses being counted.

References Cited in the file of this patent

UNITED STATES PATENTS

| | | |
|---|---|---|
| 2,586,080 | Pfann | Feb. 19, 1952 |
| 2,735,948 | Sziklai | Feb. 21, 1956 |
| 2,856,544 | Ross | Oct. 14, 1958 |
| 2,877,358 | Ross | Mar. 10, 1959 |